United States Patent [19]  
Prince

[11] Patent Number: 4,942,084  
[45] Date of Patent: Jul. 17, 1990

[54] RECONSTITUTED WOOD VENEER COVERED STRUCTURAL ELEMENTS

[76] Inventor: Kendall W. Prince, #50 E. 14th St., Mesa, Ariz. 85201

[21] Appl. No.: 213,336

[22] Filed: Jun. 30, 1988

[51] Int. Cl.⁵ .............................................. B32B 7/12
[52] U.S. Cl. .................................... 428/284; 428/286; 428/287; 428/319.1; 428/319.9; 428/461; 428/465; 428/481; 428/483; 428/492; 428/500; 428/537.1
[58] Field of Search ............... 428/151, 461, 462, 465, 428/492, 511, 537.1, 326, 464, 458, 528, 284, 286, 287, 319, 1, 319, 9, 481, 483, 560; 144/351, 352

[56] References Cited

U.S. PATENT DOCUMENTS

| 536,841 | 4/1895 | Roenigk. | |
|---|---|---|---|
| 1,810,281 | 6/1931 | Linse. | |
| 2,003,752 | 6/1935 | Landt. | |
| 2,241,312 | 5/1941 | Luty. | |
| 2,836,863 | 6/1958 | Denker. | |
| 3,110,643 | 11/1963 | Downing. | |
| 3,960,639 | 6/1976 | Kudo | 156/222 |
| 4,201,819 | 5/1980 | Schenz. | |
| 4,731,145 | 3/1988 | Senzani | 428/151 |
| 4,818,590 | 4/1989 | Prince | 428/213 |

Primary Examiner—George F. Lesmes  
Assistant Examiner—Christopher Brown

[57] ABSTRACT

A structural element made up of a suitable substrate having at least one surface to which is bonded, by means of a pressure sensitive adhesive, a decorative veneer of a fiber backed reconstituted wood. The physical properties of the structural element are dictated by the substrate. The fiber backed reconstituted wood veneer contributes primarily decorative properties. The substrate can have any desired configuration but is particularly adapted for use in the formation of slats or louvers for horizontal or vertical venetian type blinds. The substrates are preferably appropriately contoured semi-rigid or rigid aluminum strips. Expanded plastic foams, plastics, softwood or hardwood or other solid substrates may also be used. Suitable fiber backed reconstituted wood veneers are any fiber backed veneers made by a process which utilizes wood, but which does not have the cellular structure of wood. The substrate and fiber backed veneer are bonded by means of a pressure sensitive adhesive such as an acrylic or rubber adhesive which does not require the presence or application of heat.

16 Claims, 1 Drawing Sheet 4,942,084

RECONSTITUTED WOOD VENEER COVERED STRUCTURAL ELEMENTS

BACKGROUND OF THE INVENTION

This invention relates to reconstituted wood veneer covered structural elements, such as vertical or horizontal blind slats or louvers, wherein the veneer does not materially alter the durability or properties of the substrates while providing them with a permanent decorative wood coating. More particularly, this invention relates to substrates covered with a fiber backed reconstituted wood veneer wherein the fiber backed reconstituted wood, although securely bonded to the substrate, does not materially affect the structural properties of the substrate.

It is well known in the art to apply thin veneers of wood, plastic, metal, foil, canvas, cork, paper, etc. to structural substrates for decorative purposes. Sometimes the substrate is relatively thick and is made of various types of fibrous cellulosic materials. For example, plywood, particle board, solid wood and the like have been covered with veneers for use as wall panels. It is also known to use veneers over rigid non-cellulosic building materials such as sheet rock, metal, thick foamed plastics and the like.

It would be desirable to have durable decorative structural elements, including but not limited to, furniture, wall panels, door and window frames, base boards, picture frames and other moldings, venetian type blind slat or louver elements or other articles having the genuine appearance of wood but which do not have the inherent drawbacks often associated with wood veneers.

Wood veneers, although thin, posses a cellular structure which affects the properties of the laminate products. The cellular structure of the veneer, if stressed or broken, ruins the appearance of the decorative covering. Although wood veneers can be bonded to flat panels any attempt to form elements of irregular shape may result in delamination, cracking or breaking of the veneer and the like. Moreover, wood veneers with intact cellular structure become brittle, break and crack as they wear and dry out.

One means of producing suitable wood veneer products is disclosed by Prince, U.S. Pat. No. 4,818,590, issued Apr. 4, 1989 who teaches thin foamed plastic substrates covered with an even thinner wood veneer. While the veneers disclosed in this application present a significant advance over the art, they are not presently sufficiently cost effective to be competitive with commercially available non-wood veneer products.

Prior art methods of manufacturing wood veneers, particularly over metal substrates have serious limitations when it comes to continuous manufacturing methods.

DESCRIPTION OF PRIOR ART

Various means have been attempted to produce wood veneers on metal substrates. Roenigk, in U.S. Pat. No. 536,841, issued Apr. 2, 1895, teaches a thin wood veneer having a paper backing secured to and supporting the veneer. The paper backed veneer is secured to an metal sheet such as iron, zinc or other suitable metal. Back in 1895, this might have appeared to be an excellent concept, however, experience has shown that wood veneer, with or without a paper backing, simply cannot be glued to metal and become a stable article. Heat and moisture cause delamination and drying causes brittleness and cracking. There is limited flexibility and bending causes the veneer to crack and/or delaminate from the metal substrate. Some of the problems encountered by wood veneers laminated to metal substrates are addressed by Downing, U.S. Pat. No. 3,110,643, issued Nov. 12, 1963. Downing teaches the formation of a wood veneer on a metal plate by applying a thermo-setting film of resin glue to the surface of both the plate and the veneer. The veneer is bonded to the plate under a series of heat and pressure applications If the veneer covered plate, i.e. the laminate is to be subjected to bending, it must be subjected to a controlled steam treatment to prepare the wood and adhesive for stretching, bending or compression. The laminate is then pressed to the desired configuration. This process has limited application for the formation of small articles such as electrical outlet cover boxes but would not be suitable for continuous operations wherein thousands or hundreds of thousands of linear feet of production are required, as is the case with window blind elements such as slats or louvers.

One additional approach to making a wood veneer-metal substrate laminate is disclosed in Kudo, U.S. Pat. No. 3,960,639, issued June 1, 1976. In Kudo, a nonwoven cloth, coated or impregnated with a specific thermoplastic phenolic resin, is placed between a flat metal facing sheet and a flat sheet of veneer. Heat and pressure are applied to melt the adhesive and cause it to bond to the substrate and veneer surfaces. This method has the same general limitations as the Downing patent and would not be suitable for a continuous operation.

In the above mentioned prior art methods, the laminate has to be formed as a flat sheet and is then stamped or otherwise formed into a desired shape.

In fields of use such as decorative venetian type blinds, it is desirable to produce slats or louvers on a continuous basis. This has previously been done with fabric coverings laminated to aluminum substrates with pressure sensitive adhesives such as double coated plastic film tapes. However, there is a limitation to the materials which may be utilized in this process. Because thin wood veneers are easily broken, they are not suitable for application to metal blind substrates utilizing high speed continuous lamination equipment.

While imitation products such as veneers made from printed, or photographed wood plastic film on a metal substrate could be used in a continuous lamination process, their appearance is not the same as a genuine wood product.

OBJECTS AND SUMMARY OF THE INVENTION

It is an object of the present invention to provide decorative structural elements consisting of a suitable substrate covered with a thin veneer of fiber backed reconstituted wood wherein the structural properties of substrate are not materially affected by the fiber backed reconstituted wood veneer covering.

It is also an object of the present invention to provide a decorative structural element which is durable, strong, not subject to warping or heat distortion and which has the genuine and pleasing decorative appearance of wood.

These and other objects may be provided by means of a structural element made up of a suitable substrate having at least one surface to which is bonded by means of a pressure sensitive adhesive, a decorative veneer of a fiber backed reconstituted wood.

The physical properties of the structural element, and hence its utility are dictated by the substrate. The fiber backed reconstituted wood veneer contributes primarily decorative properties. The substrate can have any desired configuration but will preferably have opposing surfaces, i.e., top and bottom, inside and outside, etc. The reconstituted wood may be bonded to one or more surfaces of the substrate. Because of the unique non-cellular properties of reconstituted wood veneer, its thickness will be determined by point at which the physical properties of the substrate begin to be materially affected by the veneer.

The elements of the invention are particularly adapted for use in the formation of slats or louvers for horizontal or vertical venetian type blinds. The substrates used in this application are preferably, appropriately contoured semirigid or rigid metal strips. The most preferred substrate is aluminum because of its ready availability and demonstrated use in the blind slat or louvre market. However, other suitable metals may also be used. Expanded plastic foams, plastics, softwood or hardwood or other solid substrates may also be used. In other words, if the substrate used alone could perform the desired structural element functions without the presence of the adhering reconstituted wood veneer and can be suitably bonded to reconstituted wood, it is within the scope of suitable substrates for use in this invention. However, it should be made plain that the veneer is an integral and essential part of the invention. Without the reconstituted wood veneer, the substrate would not be aesthetically functional.

Suitable fiber backed reconstituted wood veneers are any fiber backed veneers made by a process which utilizes wood, but which does not have the cellular structure of wood, as will be more fully described. Reconstituted wood veneers are available in a variety of patterns.

The substrate and fiber backed veneer are bonded by means of a pressure sensitive adhesive such as an acrylic or rubber adhesive and does not require the presence of application of heat.

DETAILED DESCRIPTION OF THE INVENTION

Figure 1:
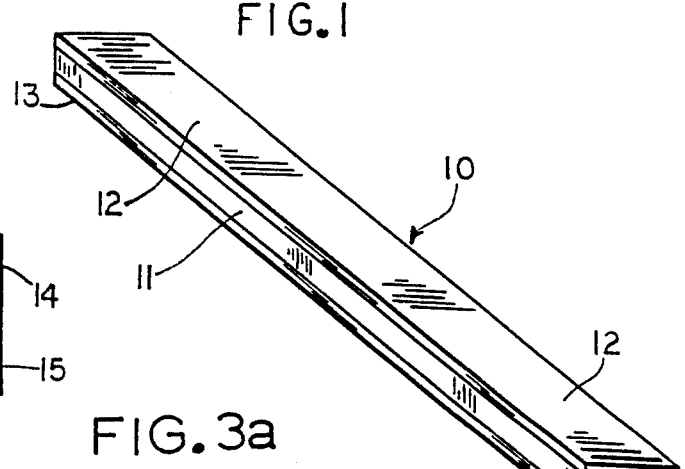
FIG. 1 is a perspective view of one embodiment of the invention showing a panel consisting of a metal substrate containing a fiber backed wood veneer bonded to both surfaces thereof by means of a double coated adhesive film tape.

Central to the preparation of suitable veneer covered substrates of the present invention is the use of fiber backed reconstituted wood veneers. Typically, these veneers are made by rotary cutting a bland, lightly-colored timber such as obeche and koto from Africa or oak from the United States. The defects are removed and the resulting sheets of veneer are vat-dyed to a desired color using heated anilinic dyes. Unlike paint, the dyes go completely through the veneer providing color that cannot be sanded out.

The dyed veneer sheets are then glued, one to another, into a large rectangular block, referred to as a "chopping block". The order in which the veneer sheets are glued together and the color of glue used enables the formation of predetermined forms or patterns. Using a combination various predetermined forms or patterns. Using a combination of dyed veneer sheets, colored adhesives and forms, the desired patterns can consistently be reproduced time after time in large quantities.

The chopping block of glued together dyed veneer sheets is then "end cut" or sliced against the normal cellular grain at a desired thickness, into new veneer sheets consisting of strips of glued together veneer. The end slicing of the chopping block against the grain destroys or limits the cellular integrity of the dyed veneer sheets making up the chopping block. The sheets sliced from the block are placed in a high temperature press with a non-oriented fiber backing sheet such as a polyester. The fiber backing sheet is heat pressed into the end cut veneer sheet providing a fiberveneer bond superior to that obtained with a glued on backing. The heat and pressure used in pressing the backing sheet into the end cut veneer sheet further crushes the wood cells from the end cut strips and develops the wood grain appearance of the reconstituted product. Because of the pattern used when gluing the initial veneer sheets together can be repeated over and over, these reconstituted veneer sheets can be produced over and over having a consistent pattern. These sheets can also be spliced together to form a veneer roll of any desirable length having the same pattern. Because the cellular integrity of the wood cells have been destroyed during the slicing and pressing procedures, the new veneer product has no "memory" and can conform or be oriented to any desired shape and remain in that shape. Hence, there is no tendency of the veneer to delaminate, crack or break because one cell is pulling against another. However, the product is made of wood and has the genuine appearance of wood.

Attachment of the fiber backed reconstituted wood veneer to the substrate is not dependent upon prior art methods of heat and pressure and can be accomplished by means of state of the art pressure sensitive adhesives. Typical pressure sensitive adhesives are those of the acrylic or rubber adhesive families and are available in tape or sheet form. A single adhesive layer may bond directly to the substrate and fiber backing of the veneer or a double adhesive with a layer on either side of a carrier such as a polyester or vinyl film or paper carrier may be used. In a double coated adhesive, the adhesive on one side of a carrier bonds to the substrate and the adhesive on the other side of the carrier bonds to the fiber backing of the veneer. If desired, the adhesives on opposing sides of the carrier may be different. The adhesives used provide excellent initial adhesion, high bond strengths to most surfaces, excellent high temperature, water and solvent resistance, ultra-violet light resistance and excellent shear holding power. In many adhesives, the bond strength increases substantially with natural aging. Representative of adhesives which may be used are Scotch brand specialty tapes manufactured by the Industrial Specialties Division/3M in the A10 to A70 acrylic adhesive family and R10 to R70 rubber adhesive family. The particular tape to use can be readily selected by one skilled in the art depending upon the substrate and fiber backing on the reconstituted wood veneer.

Such adhesive tapes, with or without a supporting carrier, are available in rolls protected by appropriate paper liners. As the tape unrolls one surface of the adhesive transfers from the liner to the surface of either the substrate or fiber backing of the veneer and adheres thereto. The opposing adhesive surface is then sequentially brought into contact with the substrate or veneer surface and lamination is completed by the application of pressure. Generally, in a continuous operation, the adhesive will first adhere to the substrate surface followed by contact with the veneer and application of appropriate pressure. Depending upon the rigidity of the substrate, it may be fed into lamination systems in pre-cut lengths or, if flexible enough, it may be fed continuously in rolls and cut in desired lengths. The adhesive tape, consisting of adhesive only or contained on a carrier, will generally be in roll form, and the fiber backed reconstituted wood veneer will generally be in roll form.

While some modification may be required, lamination systems are available to apply appropriate pressure to the veneer, adhesive, substrate combination, depending upon the contour of the substrate. Since the fiber backed reconstituted wood veneer has no memory and will readily conform to any reasonably configured substrate surface, one skilled in the art can readily adapt the lamination system to apply the adhesive and veneer to the substrate at the proper configuration and apply appropriate pressure to the veneer surface to insure proper lamination. In the case of window blind slats or louvers, double sided application of veneer to substrate may be made simultaneously.

The acrylic and rubber adhesives, with or without a supporting carrier, provide excellent initial adhesion to most smooth surfaces. For surfaces which are not entirely smooth, thicker adhesives may be required. Generally the adhesive thickness will vary from about 0.001 inch (0.025 mm) to about 0.015 inch (0.38 mm). However, if the substrate has a sufficiently uneven surface to require it, a foam tape carrier could be used having a thickness up to about 0.25 inch (6.35 mm). In most cases, the adhesive for bonding the veneer to the substrate should be as thin as possible.

Figure 2:
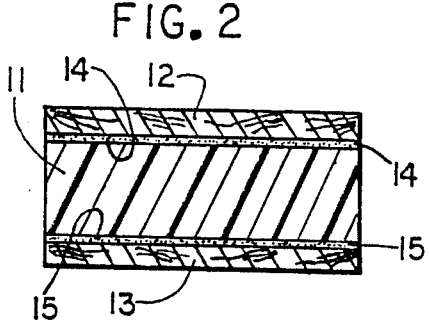
FIG. 2 is a cross sectional view of the panel shown in FIG. 1 taken along lines 2—2 thereof.

There is shown in FIGS. 1 and 2 one complete and preferred embodiment of the invention.

FIG. 1 shows a perspective view of a structural element g in the form of a panel 10 which would be suitable as a vertical venetian blind slat. Panel 10 consists of an aluminum substrate 11 having a fiber backed reconstituted wood veneer 12 and 13 adhering to the opposing surfaces thereof by means of adhesive tapes 14 and 15 consisting of polyvinyl films coated on both sides by acrylic pressure sensitive adhesives.

The substrate is critical to the functionality of venetian blind slats or louvers, and therefore must be selected to possess the desired properties. It is essential that the substrate have the proper rigidity and also be lightweight, durable, strong, resilient, heat and water resistant, and above all, be capable of having a fiber backed wood veneer bonded thereto. In the venetian type blind industry, it is usual to have slats or louvers made of aluminum because of its availability, lightweight, strength and relatively low cost. These aluminum substrates have previously been either painted or covered with a fabric material. However, no one has successfully produced an aluminum substrate to which a reconstituted wood veneer had been laminated. In addition to aluminum, any metal that is suitable for use as a substrate having the requisite properties of strength, weight, flexibility and cost may be utilized. Lightweight alloys utilizing berylium, titanium and other space age metals would be suitable replacements for aluminum. Also, foamed polyvinyl chloride plastics or any other substrate which would be suitable as a blind slat or louver and to which the reconstituted wood can be laminated would also be suitable.

As previously stated, the fiber backed veneer must not have a memory in order not to significantly alter or interfere with the desirable physical characteristics of the substrate and is preferably thin. However, without the veneer, the substrate per se would have little commercial value in the making of decorative venetian type blinds.

Accordingly, the veneer must be selected on the basis of its decorative function or appearance as well as its compatability with the substrate. By definition, a veneer is a thin ornamental or protective facing which is of superior value or appearance to its substrate. Because of the superior appearance of hardwoods, it is highly desirable that the reconstituted wood veneers utilized in the present invention be made with a pattern which simulates hardwood such as oak, maple, walnut, mahogony, cherry, etc. Such wood veneers are elegant in appearance and give the impression that the structural elements made therefrom are of solid wood. The relative size or thickness of the veneer in comparison to the substrate is not important as long as the structural laminated element is functional. What is critical is that the physical properties of the veneer do not interfere or take over the properties of the substrate. The veneer is for decorative purposes and the properties of the substrate dictate suitability of use.

Referring again to FIGS. 1 and 2, although not drawn to scale, a venetian type blind panel vertically hung can be constructed with panels 10 being approximately 0.060 inch (1.5 mm) thick and 3 inches wide and of any desired length, e.g. 84 inches. Of the 0.060 inch thickness, the substrate 11 is about 0.016 inch (0.4 mm), each fiber backed reconstituted wood veneer 12 and 13 is about 0.020 inch (0.5 mm) thick and each adhesive 14 and 15, consisting of polyamide film tape coated with acrylic adhesive, is about 0.002 inch (0.05 mm) thick. The reconstituted wood veneer 12 and 13 does not prevent the substrate 11 of the panel from bending, flexing, twisting or otherwise being manipulated within the limits and in the manner of conventional blind slats or panels. Moreover, the panel will not lose its configuration by warping, splitting, will not change in dimensions by shrinking or swelling and will not break upon impact as easily as wooden panels might. The panels remain resilient and will not become distorted in shape as homogeneous plastic or metal panels might unless severely bent. However, the patterned wood grain in each panel gives the appearance that it is made of solid, beautifully grained hardwood.

As stated above, there is no strict mathematical ratio between veneer thickness and substrate thickness outside of which the invention will not function. Rather, the ratio is a functional one being dependent upon the point at which the veneer starts to inhibit the structural performance of the substrate. Therefore, if in FIGS. 1 and 2, the substrate was a polyvinyl chloride foam, the thickness of substrate 11 would be more in the order of 0.16 inch (4.0 mm). However, the veneer and adhesive thicknesses would remain the same and the laminate would have a cross section more on the scale as shown in FIGS. 1 and 2.

FIGS. 3a-3e show various other panel configurations which may be used in the present invention. In these embodiments, the adhesive layer is not shown with the same particularity as in FIG. 2. However, it would be illustrated the same if shown.

Figure 3A:
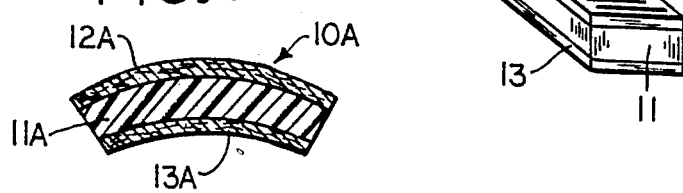
FIG. 3a–3e are cross sectional views of other panel embodiments showing various structural configurations and also showing some substrates having only a single veneer.

FIG. 3a shoes a typical cross section of a horizontal venetian blind slat 10A comprising a contoured substrate 11A having adhered thereto fiber backed reconstituted wood veneers 12A and 13A. Preferably, the substrate is a metal such as aluminum.

Figure 3B:
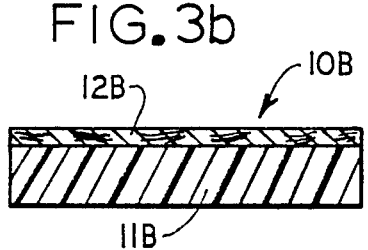

Similarly, FIG. 3b is a cross section of a door panel 10B made up of a flat substrate 11B and a single veneer 12B. Substrate 11B may be of any suitable material for making door panels. For example, solid softwood such as pine would be suitable. Hollow cores of wood, plastic or even light metal could also be used.

Figure 3C:
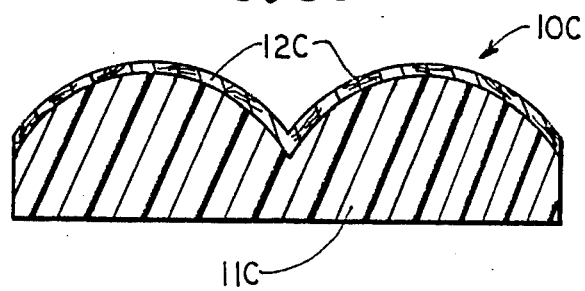

FIG. 3c is a cross section of an irregular surfaced panel 10C such as might be utilized on a picture frame consisting of an irregularly surfaced substrate 11C containing single veneer 12C of fiber backed reconstituted wood. Any other substrate having an irregular surface such as moldings used as baseboards, door or window frames, and the like are within the scope of this embodiment. Such may be made of wood, simulated wood made from plastic, pressed wood, or other substrates to which a fiber backed reconstituted wood veneer can be appropriately attached.

Figure 3D:
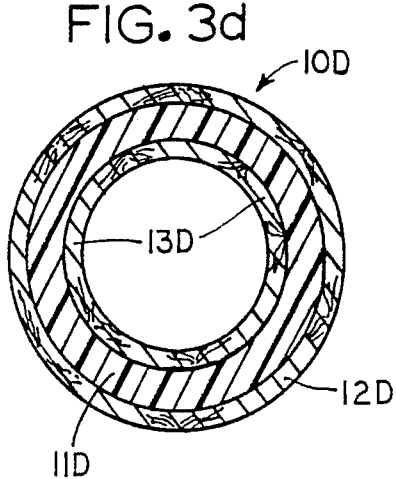

FIG. 3d shows a cross section of a cylinder 10D which might be used as the outer surface in the making of containers such as ice buckets, drinking cups or glasses, trash receptacles and the like made up from a circular substrate 11D containing a reconstituted wood outer veneer 12D and a plastic inner veneer 13D.

Figure 3E:
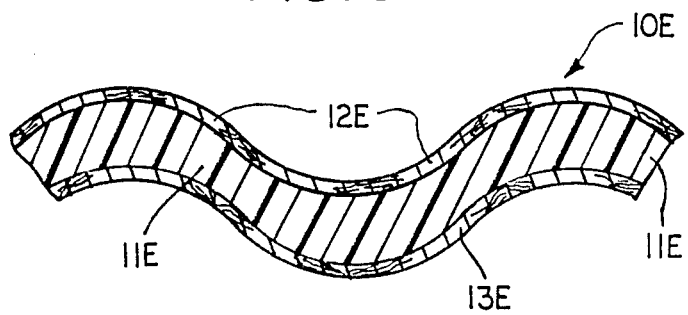

FIG. 3e shows a panel 10E consisting of a corrugated substrate 11E containing veneers 12E and 13E which could be of reconstituted wood veneers having different wood patterns on either side and suitable for use as a divider for rooms or making cubicles.

The uses to which the present invention may be put are limited only by the imagination. The embodiments used as venetian blind slats or louvers have currently been found to be the most practical and are preferred embodiments. However, the scope of the invention is to be limited only by the claims which follow.

I claim:

1. A structural element which comprises a structurally stable substrate having a fiber backed reconstituted wood veneer laminated to at least one surface thereof by means of a pressure sensitive adhesive wherein the structural properties of the substrate are not materially affected by the physical properties of the fiber backed reconstituted wood veneer.

2. A structural element according to claim 1 wherein the fiber backed reconstituted wood veneer has no cellular integrity.

3. A structural element according to claim 2 wherein the fiber backed reconstituted wood veneer is prepared by gluing sheets of veneer together to form a block, end slicing a sheet from said block and heat pressing a fiber backing into said end sliced sheet to form a predetermined wood pattern.

4. A structural element according to claim 3 wherein the substrate has opposing surfaces.

5. A structural element according to claim 4 wherein the substrate is made of a member selected from the group consisting of wood, plastic, plastic simulated wood, plastic foam and metal.

6. A structural element according to claim 5 wherein the substrate is a metal.

7. A structural element according to claim 6 wherein the substrate is aluminum.

8. A structural element according to claim 7 wherein both substrate surfaces are covered with a fiber backed reconstituted wood veneer.

9. A structural element according to claim 8 structured as a vertical venetian type blind panel.

10. A structural element according to claim 8 contoured and structured as a horizontal venetian type blind panel.

11. A structural element according to claim 5 structured to have an irregular surface.

12. A structural element according to claim 11 wherein the substrate is a member selected from the group consisting of wood, plastic foam and plastic simulated wood.

13. A structural element according to claim 12 wherein the element is a molding.

14. A structural element according to claim 5 structured to have a smooth outer surface.

15. A structural element according to claim 14 wherein the substrate is a member selected from the group consisting of wood, plastic foam and plastic simulated wood.

16. A structural element according to claim 15 wherein the element is a door or window frame.

* * * * *